Sept. 7, 1965   F. S. WALKER   3,205,351
VEHICLE SKYLIGHT
Filed May 16, 1963   2 Sheets-Sheet 1
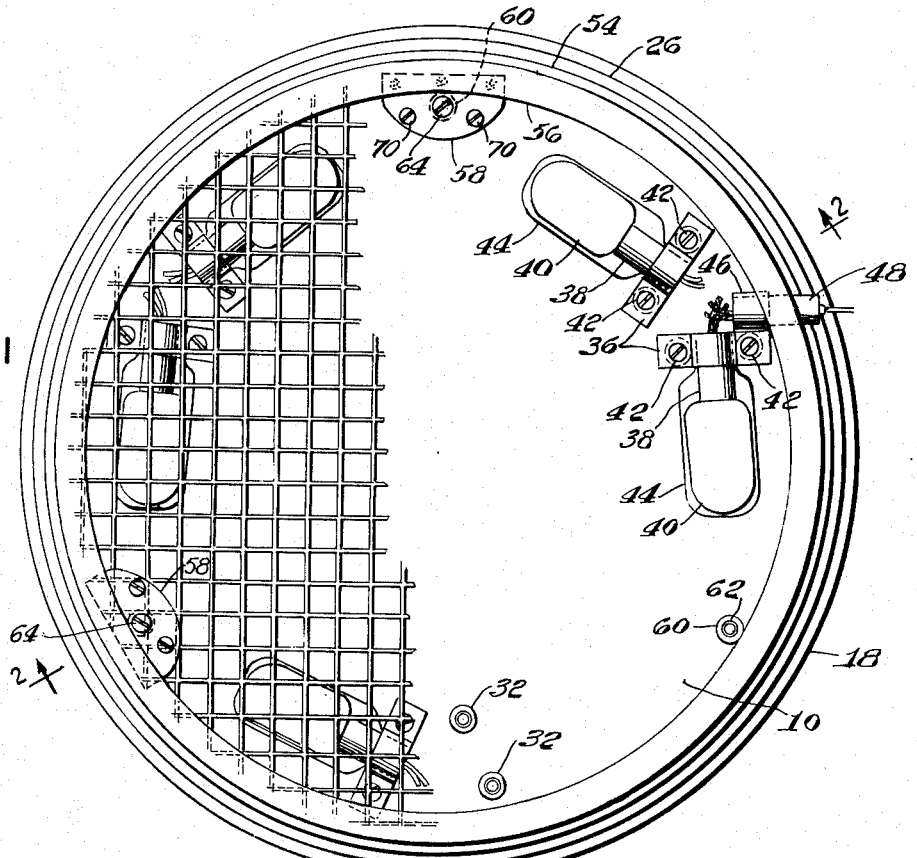
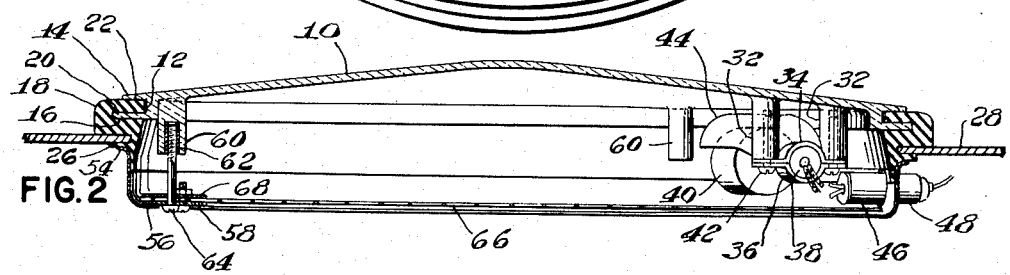
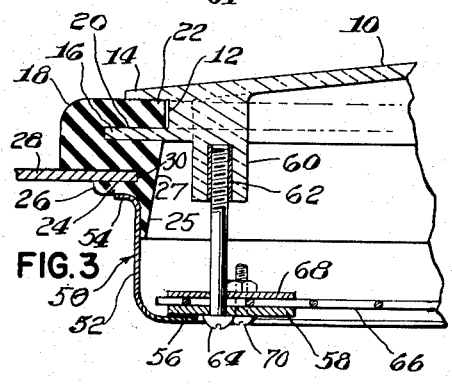
INVENTOR.
Frank S. Walker
BY Robert P. Churchill
ATTORNEY

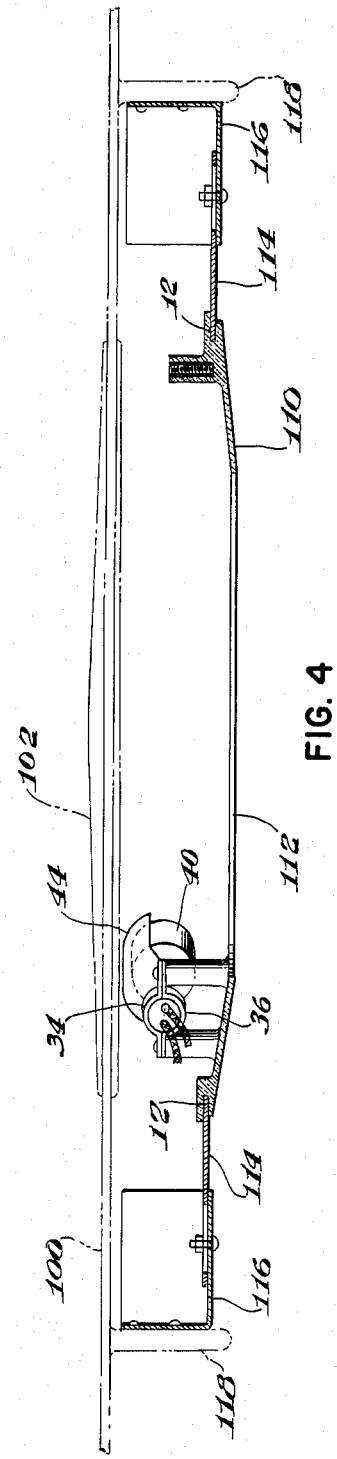

United States Patent Office

3,205,351
Patented Sept. 7, 1965

3,205,351
VEHICLE SKYLIGHT
Frank S. Walker, 57 Salem End Lane,
Framingham, Mass.
Filed May 16, 1963, Ser. No. 280,914
12 Claims. (Cl. 240—7.35)

This invention relates to a skylight particularly adapted for installation in the roof of a vehicle body or the like.

The invention has for an object to provide a novel and improved skylight adapted for supporting artificial lighting elements and which is characterized by novel structure for assuring a tight and leakproof seal between the opening in the roof and the skylight.

With this general object in view and such others as may hereinafter appear, the invention consists in the skylight hereinafter described and particularly defined in the claims at the end of this specification.

In the drawings illustrating the preferred embodiment of the invention:

FIG. 1 is a plan view of a skylight, as viewed from the underside, embodying the present invention;

FIG. 2 is a cross sectional view of the same as seen from the line 2—2 of FIG. 1;

FIG. 3 is an enlarged cross sectional detail view illustrating the skylight sealing and clamping means; and FIG. 4 is a cross sectional view illustrating the manner in which a portion of the skylight shown in FIG. 2 may be inverted and used with an existing skylight in the roof of a vehicle.

In general the present invention contemplates a novel and improved skylight of the type adapted to be installed in the roof of a vehicle body for admission of light during daylight hours and having provision for supporting artificial lighting elements for use in the nighttime. In accordance with the present invention the skylight is provided with a resilient rim portion of rubber or like material mounted in sealing relation about the periphery of the skylight and adapted to be fitted in sealing relation around the opening in the vehicle roof and wherein provision is made for clamping the skylight and the resilient rim to the roof of the vehicle in a novel manner such as to provide a weathertight seal between the skylight and the roof.

Referring now to the drawings, the present skylight includes a transparent or translucent light admitting member 10 of plastic, fiberglass or like material. As illustrated in FIG. 2, the light admitting member 10 is slightly conical in shape and is provided with a peripheral groove 12 defined by an upper wall 14 and a lower wall 16 molded integrally with the light admitting member. The light admitting member 10 is provided with an annular resilient rim portion 18 of rubber or like material having an inwardly directed groove 20 at its upper end providing a resilient upper flange 22 arranged to be snugly received in the peripheral groove 12 of the light admitting member so that the upper wall 14 overlaps the top of the flange 22 and so that the inwardly directed groove 20 embraces the lower wall 16 of the light admitting member in sealing engagement as shown.

In practice the annular rim 18 may be stretched around and inserted into the groove 12 to assemble the rim with the light admitting member 10. The rim portion 18 is further provided with an outwardly directed peripheral groove 24 at its lower end providing a lower flexible flange 26. In order to assemble the rim portion 18 in the roof 28 of the vehicle the flexible flange 26 may be bent downwardly and inwardly to permit entrance of the skylight unit into an opening 30 in the metal roof whereupon the flange will flex back to its original position to secure the skylight to the roof. The groove portions 12 and 24 may be provided with a suitable cement to assist in providing a substantially weathertight seal. The rim portion 18 is further provided with a depending extension 25 from the inner wall 27 of the rim portion as illustrated.

As herein shown, a plurality of depending lamp supporting extensions 32 are molded integrally with the plastic light admitting member 10 and are arranged in pairs and in spaced groups adjacent the periphery of the skylight unit. The depending lamp supporting extensions 32 are cylindrical in cross section and are provided with central openings at their lower ends for receiving self-tapping screws. Each pair of extensions 32 has secured thereto upper and lower semicircular flanged clamping members 34, 36 between which the cylindrical stem 38 of a lamp 40 is supported, as shown, the clamping members being secured to the extensions by the self-tapping screws 42. The upper clamping member 34 is provided with an extension comprising a shield 44 to shield the light from shining upwardly through the light admitting member. Each group of lamp supporting extensions comprises two pairs of extensions spaced to support their respective lamps in opposing directions so that the lamps extend longitudinally adjacent the marginal portions of the unit substantially at right angles to radial lines extended from the center of the unit as shown. As illustrated herein, there are three spaced groups or pairs of lamps thus supported, and the wiring to the lamps may be connected to a socket 46 supported from one of the extensions 32 and into which a plug 48 may be inserted to connect the lamps to any suitable power source.

As illustrated in FIGS. 2 and 3, provision is made for clamping the light admitting member 10 and the resilient rim member 18 to the margin of the roof opening 30 in weathertight sealing engagement with the roof. For this purpose an annular metal clamping member 50 is provided arranged to fit over the depending extension 25 and to bear against the underside of the lower flange 26. As herein shown, the clamping member 50 is provided with a side wall 52 having an outwardly extended flange 54 at its upper end and an inwardly extended flange 56 at its lower end. The outwardly extended flange 54 bears against the flexible flange 26, and the inwardly extended flange 56 is provided with three circumferentially spaced U-shaped plates 58 spot welded or otherwise secured to the upper face of the lower flange 56. The plastic light admitting member 10 is further provided with three circumferentially spaced depending extensions 60 formed integrally with the plastic light admitting member and aligned with said plates 58. Each integral depending extension 60 is provided with a threaded bushing 62 molded therein and arranged to receive a fastening screw 64 extended through an opening in the plate 58 as shown. The inwardly extended flange 56 also supports a protective screen 66 which lies over the plate 58, and a second and similar plate 68 placed over the screen 66 and above each plate 58 is secured to the plates 58 by bolts 70, as shown, to clamp the screen therebetween.

With this construction it will be seen that when the fastening screws 64 are tightened the plastic light admitting member 10 will be pulled down against the resilient rim 18 which comprises the sealing member to press tightly against the upper surface of the marginal edge of the roof opening 30, and the rigid flange 54 will be pulled up against the flexible flange 26 to press tightly against the lower surface of the marginal edge of the roof opening. As a result, the resilient sealing rim 18 of the skylight unit will be clamped tightly about the marginal edge of the roof opening to provide a positive weathertight seal between the skylight unit and the vehicle roof.

It will be observed that the marginal wall extensions 14 and 16 are of a diameter such as to extend beyond the edge of the roof opening above the roof and that the outwardly extended flange 54 of the clamping member 50 extends beyond the edges of the opening below the roof. It will also be observed that the depending extensions 60 are formed integrally with the plastic light admitting member. As a result, the sealing rim 18 is tightly clamped about the opening to prevent leakage at the roof joint.

It will also be observed that the grooved portion 12 in the plastic member 10 snugly receives the inwardly directed flange 22 of the rim 18 whereby to provide a leakproof seal between the member 10 and the rim. With this construction it will also be seen that the overlying wall portion 14 of the plastic member protects the seal at the joint between the plastic member 10 and the resilient sealing rim 18 from external obstruction such as tree branches and the like.

An important advantage of the present structure is that the fastening means for securing the unit to the roof does not require any opening or openings to be formed in the plastic member through which leakage might occur. Another important advantage of the present structure resides in the fact that when in assembled condition the unit cannot be forced upwardly out of the roof opening by pressure built up within the vehicle body by virtue of the clamping arrangement provided by the member 50.

From the description thus far it will be seen that the present skylight for a vehicle body is conveniently adapted to support artificial lighting elements for use in providing light within the vehicle during the nighttime, and which is characterized by novel clamping and sealing means for affording a weathertight seal with the roof opening. Another advantage of the present skylight unit structure resides in the provision of the integral extensions 32 and the light clamping members 34, 36 which provide a novel and economical manner of mounting and installing the lamps and the wiring without drilling any holes whereby the cost of installation of the lamps is reduced to a minimum.

FIG. 4 illustrates a condition in which portions of the present skylight unit may be employed for the purpose of providing artificial lighting in a vehicle body 100 provided with an existing skylight 102 shown in broken lines. As herein shown, the present skylight light admitting member 110 is supported in an inverted position beneath the existing skylight 102, and the lamps 40 supported by the inverted plastic member 110 are disposed immediately below the existing skylight. In this embodiment the lamp stem clamping members 34, 36 are also reversed to place the shield 44 above the lamp, as shown, and a large central opening 112 may be provided in the plastic member 110 to admit daylight from the existing skylight and to permit direct light from the lamps without diffusion by the plastic member.

The skylight unit shown in FIG. 4 may be supported from the roof in any usual or preferred manner. As herein shown, metal plates 114 extended into the groove 12 on opposite sides of the plastic member 110 may be adjustably supported by brackets 116 attached to the spaced roof reinforcing ribs 118 usually found in a vehicle body.

While the preferred embodiment of the invention has been herein illustrated and described, it will be understood that the invention may be embodied in other forms within the scope of the following claims.

Having thus described the invention, what is claimed is:

1. A skylight for the roof of a vehcile body comprising a circular translucent plastic light admitting member having a peripheral groove, an annular resilient rim having a groove in its inner periphery providing an upper resilient flange fitted into the groove of the light admitting member, said rim also having a groove in its outer periphery providing a lower flange adapted to be fitted over the marginal edges of an opening in the vehicle roof, an annular rigid clamping member having portions arranged to bear against said lower resilient flange, and fastening means cooperating with said clamping member and secured to said light admitting member to effect clamping of the light admitting member to the rim and clamping of the rim about the upper and lower marginal surfaces of the roof opening to provide a weathertight seal.

2. A skylight as defined in claim 1 wherein the peripheral groove in said light admitting member is defined by an upper wall and a lower wall, said upper resilient flange being received between said walls, and said lower wall being embraced by the groove formed in the inner periphery of the rim to provide an interlocking seal between the rim and the light admitting member.

3. A skylight as defined in claim 2 wherein the grooved portions are provided with cement to secure the parts in weathertight sealing engagement.

4. A skylight as defined in claim 1 wherein the annular clamping member is provided with an upright side wall having an outwardly extended flange portion at its upper end for engagement with said lower resilient flange and an inwardly extended flange at its lower end, said light admitting member being provided with integral depending portions, and said fastening means comprising screws connecting said annular clamping member to said depending portions to effect the clamping operation.

5. A skylight as defined in claim 4 wherein the light admitting member is provided with integral depending portions adapted to support artificial lighting elements.

6. A skylight as defined in claim 5 wherein the inwardly extended flange of said annular clamping member is provided with inwardly extended plates secured to the flange and through which said screws are extended, a protective wire mesh screen extending over said plates and supported by said flange, a second plate disposed above each of said first plates, and fastening means for securing the plates together to clamp the screen therebetween.

7. A skylight for the roof of a vehicle body comprising a plastic light admitting member having a peripheral groove, a resilient sealing rim having a groove in its inner periphery providing an upper resilient flange snugly fitted into the groove of the light admitting member to provide a leakproof seal between the plastic member and the sealing rim, said sealing rim also having a groove in its outer periphery providing a lower resilient flange adapted to be inserted within the marginal edges of an opening in the vehicle roof and to lie against the undersurface of said marginal edges, a rigid clamping member having portions arranged to bear aaginst said lower resilient flange, said plastic member having a plurality of depending extensions formed integrally therewith, and fastening means extended through said clamping member and engaged with said depending extensions to effect clamping of said resilient rim about the upper and lower marginal surfaces of the roof opening to provide a weathertight seal.

8. The combination as defined in claim 7 wherein the peripheral groove in said plastic light admitting member is defined by an upper wall and a lower wall, said upper wall extending over the upper surface of resilient sealing rim to protect the same from external obstructions.

9. The combination as defined in claim 8 wherein the lower wall of said peripheral groove extends laterally beyond the outer edges of said upper wall, said fastening means effecting a downward clamping pressure of said plastic member and said lower wall against said resilient rim and the upper marginal surface of the roof opening, and effecting an upward clamping pressure of said clamping member against the lower resilient flange and the lower marginal surface of the roof opening.

10. A skylight for the roof of a vehicle body comprising a plastic light admitting member having a resilient sealing rim, said rim having portions adapted to be fitted about the marginal edges of an opening in the roof of the vehicle body, a plurality of spaced depending extensions formed integrally with said plastic member around the marginal portions of the plastic member and within said opening, a rigid clamping member having portions engageable with the underside of said rim, fastening means extending through said clamping member and engaged with said depending extensions to effect clamping of said resilient rim about the upper and lower marginal surfaces of the roof opening to provide a weathertight seal, and lamp supporting means including a plurality of spaced pairs of depending extensions formed integrally wtih said plastic light admitting member, and a pair of flanged semicircular clamps secured to each pair of said extensions for supporting the stem portion of a lamp.

11. A skylight for the roof of a vehicle body comprising a plastic light admitting member having a resilient sealing rim, means for clamping said rim about the marginal edges of an opening in the roof, and lamp supporting means including a plurality of spaced pairs of depending extensions formed integrally with said plastic light admitting member, and a pair of flanged semicircular clamps secured to each pair of said extensions for supporting the stem portion of a lamp.

12. The combination as defined in claim 11 wherein one of said semicircular clamps is provided with an extension providing a shield over one side of its lamp.

References Cited by the Examiner
UNITED STATES PATENTS

| | | | |
|---|---|---|---|
| 1,599,958 | 9/26 | Fraser | 240—7.25 X |
| 2,128,679 | 8/38 | Kielian | 240—8 |
| 2,918,566 | 12/59 | Lunsford | 240—7.1 |
| 3,012,375 | 12/61 | Wasserman | 50—52 X |
| 3,113,728 | 12/63 | Boyd | 240—9 |

NORTON ANSHER, *Primary Examiner*.